INVENTOR.
WATSON S. EASTMAN
LEO M. BERGMAN
BY
Geo. R. Schermerhorn
Attorney

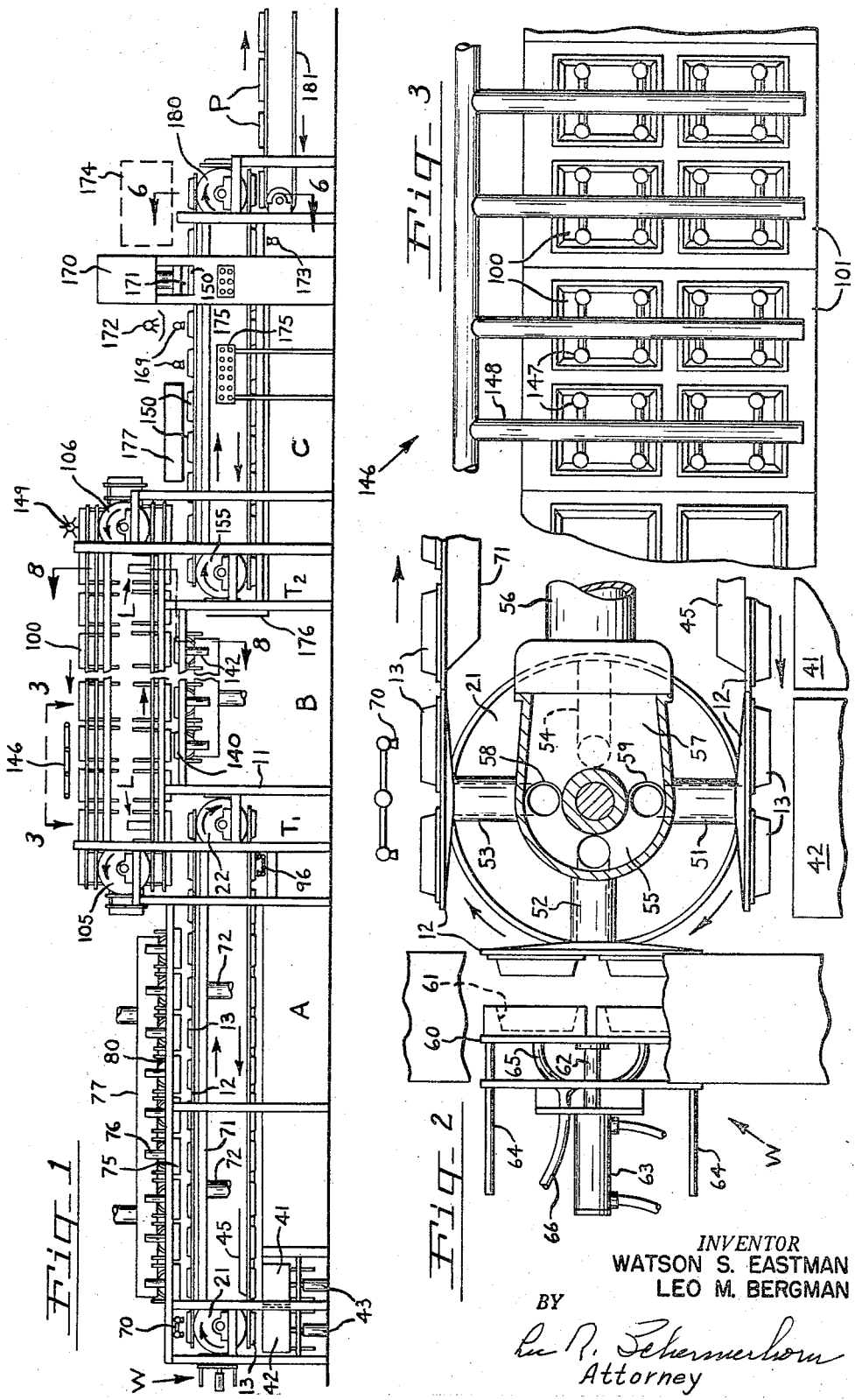

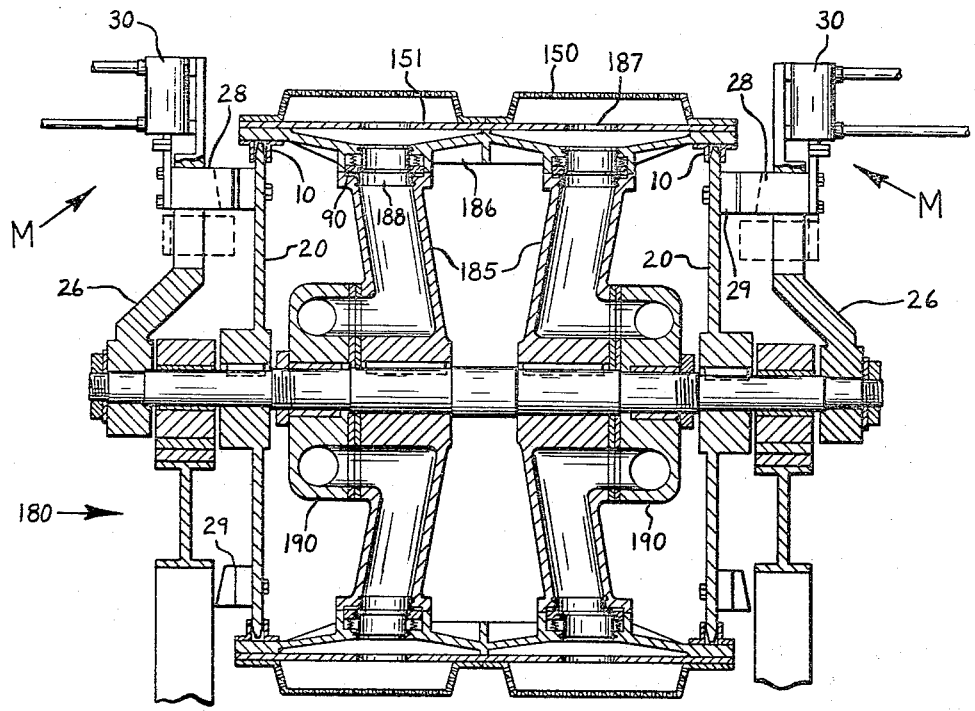
Fig_6
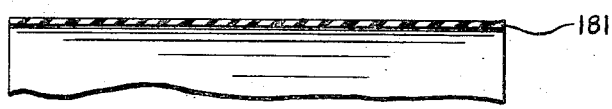
Fig_7
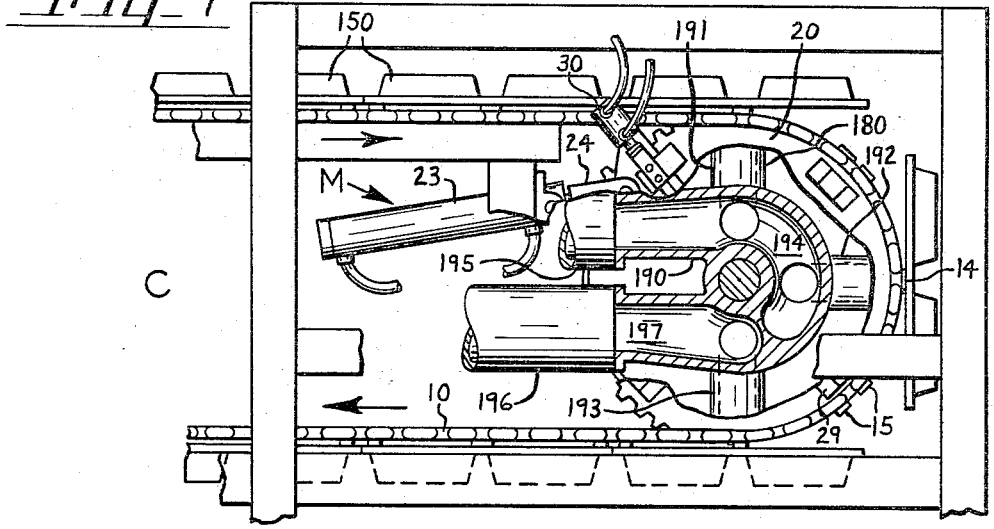
INVENTOR
WATSON S. EASTMAN
LEO M. BERGMAN
BY
*Schermerhorn*
Attorney

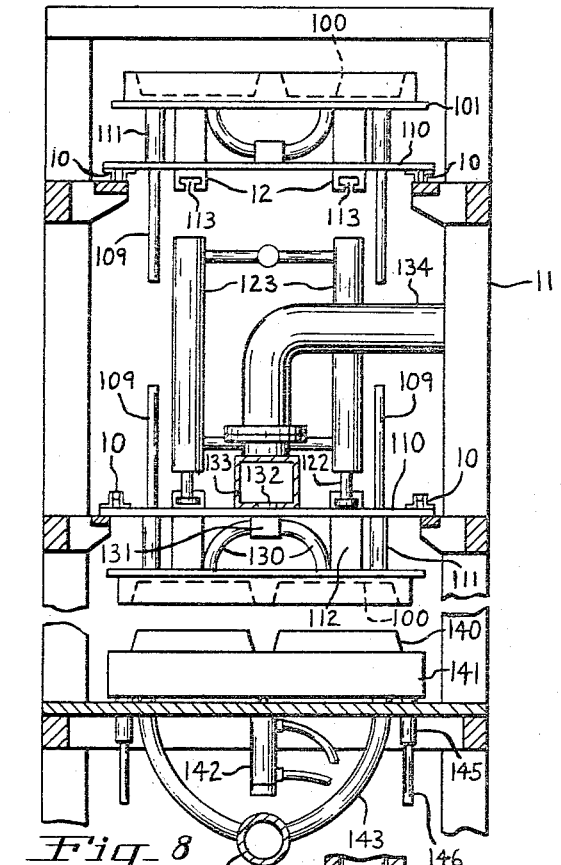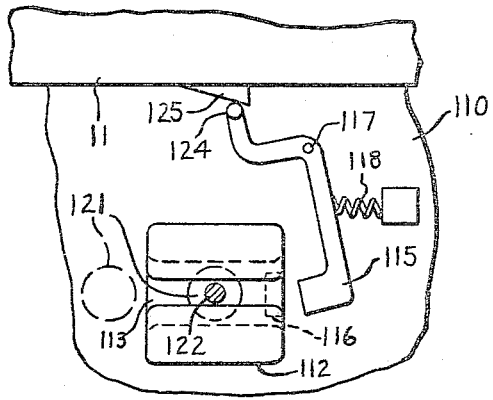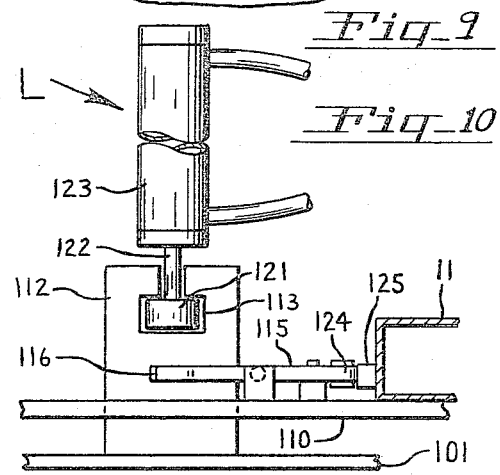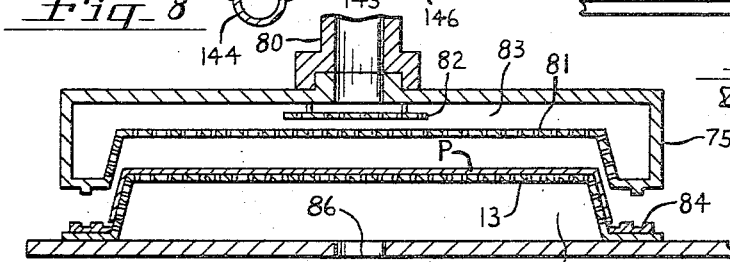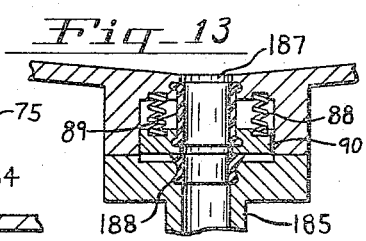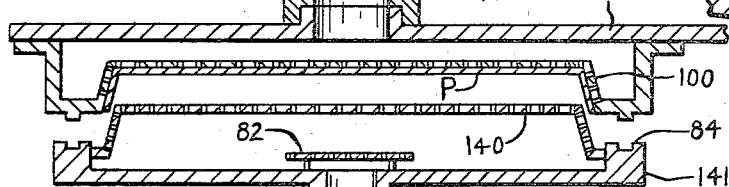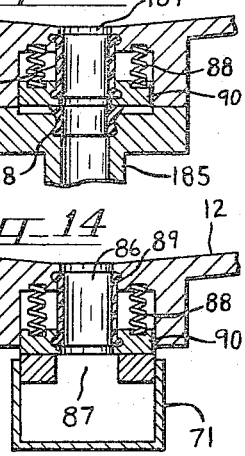
INVENTOR
WATSON S. EASTMAN
LEO M. BERGMAN
BY
Attorney United States Patent Office 3,373,079
Patented Mar. 12, 1968

3,373,079
PULP AND FIBER MOLDING APPARATUS INCLUDING RESIN APPLICATION MEANS
Watson S. Eastman, 7325 SW. Newton Place, Portland, Oreg. 97225, and Leo M. Bergman, Portland, Oreg.; said Bergman assignor to said Eastman
Filed Sept. 18, 1964, Ser. No. 397,369
17 Claims. (Cl. 162—265)

This invention relates to flexible processes and apparatus for molding a wide variety of articles having different structural characteristics and, in some cases, having different structural properties in different portions of the same article.

Various types of articles have heretofore been made from wood flour, wood particles and wood pulp. Using expensive heavy duty presses and resins, the wood flour molding industry forms wood flour into such products as chair seats, backs, table tops, trays, cabinet doors and toilet seats. Again, using expensive heavy duty presses and resins, the hardboard industry forms wood particles into strong construction boards such as the well-known particle board and paneling. These are known as dry processes. Such processes are subject to the objection that at large volume production speeds, dry materials are difficult to distribute throughout solid molding dies or forms containing high tapered walls, complex contours, ribbing and dividers. Consequently, these processes are limited in commercial practice to the type of products mentioned, all substantially flat or of substantially uniform thickness. Even with such products, the conventional processes are relatively slow and costly whereby the products are not entirely a successful substitute for ordinary nailed wood construction.

With vacuum and porous dies, the pulp molding industry molds wood pulp into many complex forms and shapes. Egg cartons, industrial contour packaging, egg case fillers and contoured fruit trays are made inexpensively in this way. Vacuum and porous dies easily distribute wood pulp throughout molding dies containing tapered walls, complex contours, ribbing and dividers but without heat, compression and resins, the conventional products heretofore made in this way remain soft, flexible and structurally weak as typified by the well-known molded egg cartons. No process has heretofore been devised to mold, by fast, automatic machine operation, low cost expendable products to serve the many purposes of nailed wooden construction and with equal or superior strength.

The present processes bridge all three industries above mentioned to mold, by fast automatic machine operation, low cost expendable and durable products having strength and durability equal or superior to nailed wooden construction. Large, thick pre-forms are molded from wood fiber and resin. With the application of heat and compression, wood-like products are produced without limitation to the substantially flat shapes or small volumes heretofore made by the wood flour and hardboard industries. With these new processes, many products presently requiring sawing, nailing and finishing can now be molded in one piece. Improved soft and flexible products can be efficiently molded from vegetable and synthetic fibers. These new processes and apparatus overcome production problems which have heretofore required high prices, preventing commercial use particularly in large volume fields such as expendable containers and pallets.

The general object of the present invention is, therefore, to provide improved processes and apparatus for molding a wide variety of products from wood or other suitable fiber at volume production speeds.

Other objects are to provide a novel and efficient method for drying large thick wood pulp or other fiber pre-forms, to provide improved means for applying resin and improved means for pressure molding causing the products to acquire a wood-like strength and other structural qualities equal or superior to nailed wood construction, to provide means for laminating a pre-form with different grades or colors of pulp or other fiber, to provide means for calendering both opposite surfaces of a product for higher quality and adaptability to printing, to provide improved drying and shaping dies, to provide methods for imposing selective compression on the pre-forms to make articles of varying density and hardness in different portions of the article, to provide a flexible machine which is readily adaptable to make different types of products including plastic products and to eliminate the slow and costly drying or curing tunnel heretofore required in molding processes.

The present apparatus comprises a conveyor-type continuous production machine having three sections which can be used together in different combinations to produce different types of products from a wide variety of materials. These three sections comprise three separate conveyors having step by step movement arranged end to end in overlapping relationship and equipped with means to transfer the pre-forms from one conveyor to another for a series of operations. The first conveyor is referred to as the wet end and has means for suction molding from an aqueous pulp slurry or other fibers, means for removing excess water and means for one surface drying. The center section has means for opposite surface drying and low compression, and pre-curing resins, and also means for dry molding for certain products. The terminal end is designated as the compression section. This conveyor passes through a high pressure press for consolidating the fibers to the density of a wood-like product when desired and includes means for removing remaining moisture which would otherwise cause a press explosion.

For the production of expendable, low cost, wood-like products, all three sections are used. For the production of more durable wood-like products, the initial formation takes place in the center section and then only the center and compression sections are used. For the production of resilient, or soft, pulp or other fiber products, only the wet end and center sections are used.

An advantage of great importance in this arrangement is the elimination of the conventional drying tunnel for wet, suction molded pre-forms. Instead, drying of wet pre-forms is accomplished in two steps by porous hot air or steam heated drying dies. A first set of drying dies dries the pre-forms from one side to center and a second set of dies dries them from the opposite side to center in a manner to eliminate shrinkage and warpage. This greatly reduces the treatment time for each article and, also, reduces the equipment cost and amount of floor space required. The saving in cost alone approximates the cost of a second complete machine. This drying process facilitates press automation by eliminating hand fitting of shrunk and warped pre-forms into compression dies.

Still other objects and advantages will become apparent and the invention will be better understood from the following description of the processes and a preferred embodiment of the apparatus illustrated in the accompanying drawings. Various changes may be made, however, in the details of construction and arrangement of parts, and in the details of the processes, and certain features may be used without others. All such modifications within the scope of the appended claims are included in the invention.

In the drawings:
FIGURE 1 is a side elevation view of a preferred embodiment of apparatus for carrying out the processes of the invention;

FIGURE 2 is a fragmentary enlarged view with parts broken away showing the de-watering and compression station at the left end of the left conveyor of FIGURE 1;

FIGURE 3 is an enlarged fragmentary top plan view on the line 3—3 of FIGURE 1;

FIGURE 6 is an enlarged view taken on the line 6—6 in FIGURE 1;

FIGURE 7 is a view in side elevation with parts broken away showing the structure in FIGURE 6;

FIGURE 8 is a view on the line 8—8 in FIGURE 1;

FIGURE 9 is a fragmentary top plan view with parts in section, showing the latch mechanism for certain die holders;

FIGURE 10 is a fragmentary end elevation view with parts in section, showing further details of the die latching and raising and lowering mechanism;

FIGURE 11 is a cross-sectional view of a first stage drying die;

FIGURE 12 is a cross-sectional view of a second stage drying die;

FIGURE 13 is an enlarged fragmentary sectional view showing the sealing means between the wheel and die holders in FIGURE 6; and FIGURE 14 is a similar view showing the sealing means between the suction box and die holder in FIGURE 11.

The apparatus involves essentially the three conveyor sections A, B and C shown in FIGURE 1. The first section A may be referred to generally as the wet end section and, more particularly, as the pulp or fiber forming and first stage drying section. The second section B constitutes a second drying and low compression section. The third stage C is a final moisture removal, resin curing and high compression section. The pre-forms are transferred from conveyor section A to conveyor section B at transfer station $T_1$ and from section B to section C at transfer station $T_2$.

In the manufacture of certain products, the process starts in section A and continues through sections B and C, for certain products section C is not used and for still other products section A is not used. The three conveyors in these three sections are driven independently so that all three may be synchronized together in step-by-step movement or the conveyor in either of sections A or C may be stopped when one or the other of these sections is not involved in the process for making a particular product.

Figure 4:
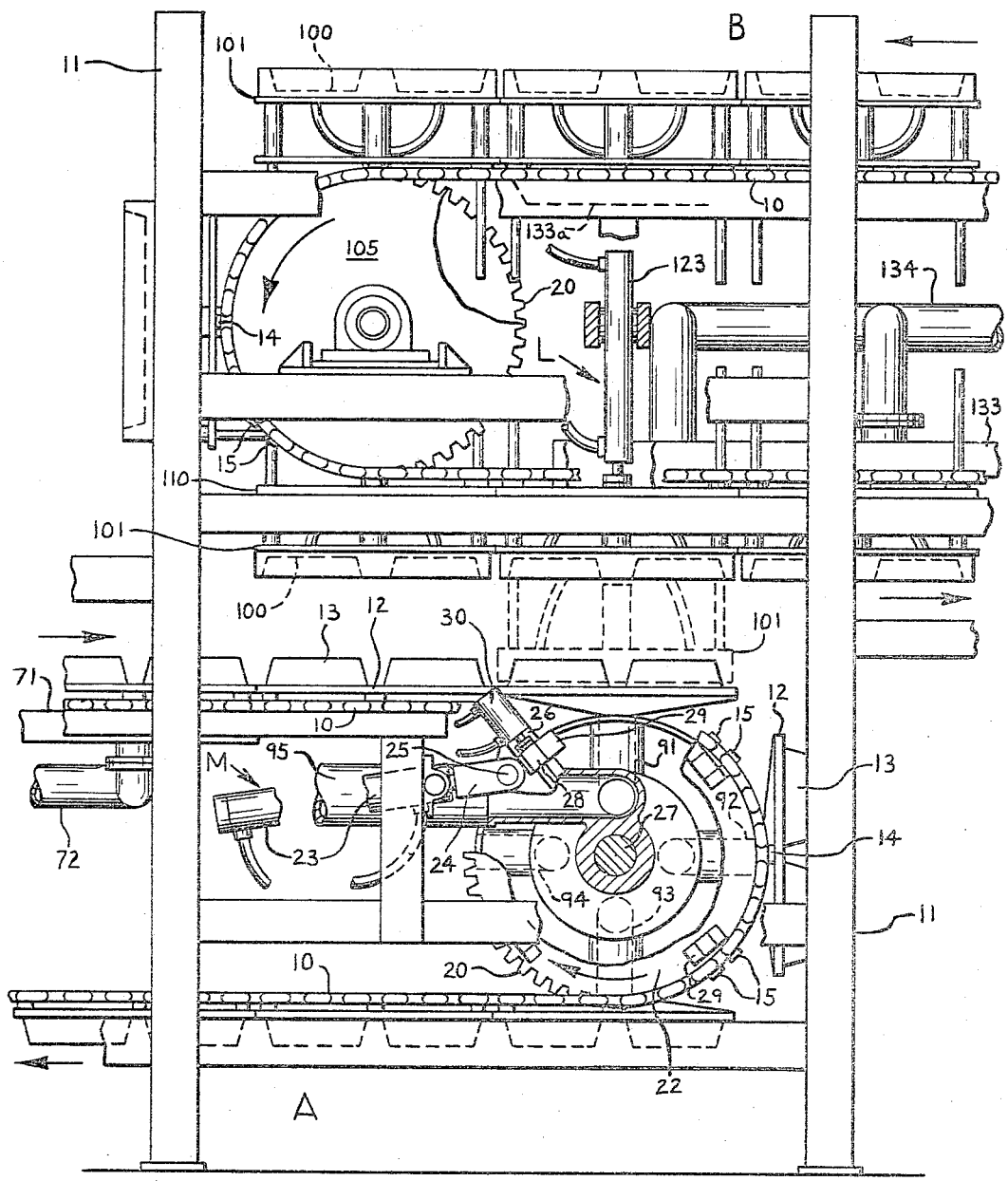
FIGURE 4 is an enlarged fragmentary side elevation view showing transfer station $T_1$ in FIGURE 1.

As shown in FIGURE 4, the conveyor for section A comprises endless roller chains 10 running on suitable horizontal tracks on the frame 11 of the machine. Preferably, there are two of the chains 10 connected to opposite sides of die holders 12, each of which carries one or more porous screen pick-up dies 13. In order to pass around the end sprocket wheels, each side of each die holder is connected at mid-length to an angle rest 14 on one link of the chain. Certain other links are equipped with angle rests 15 which support the die holders in the top horizontal run but are not connected to the die holders so that the chain will follow the sprocket wheels as shown. The chains 10 are trained around sprocket wheels 20 on opposite ends of a suction wheel 21 and a compressed air wheel 22 shown in FIGURE 1.

Figure 5:
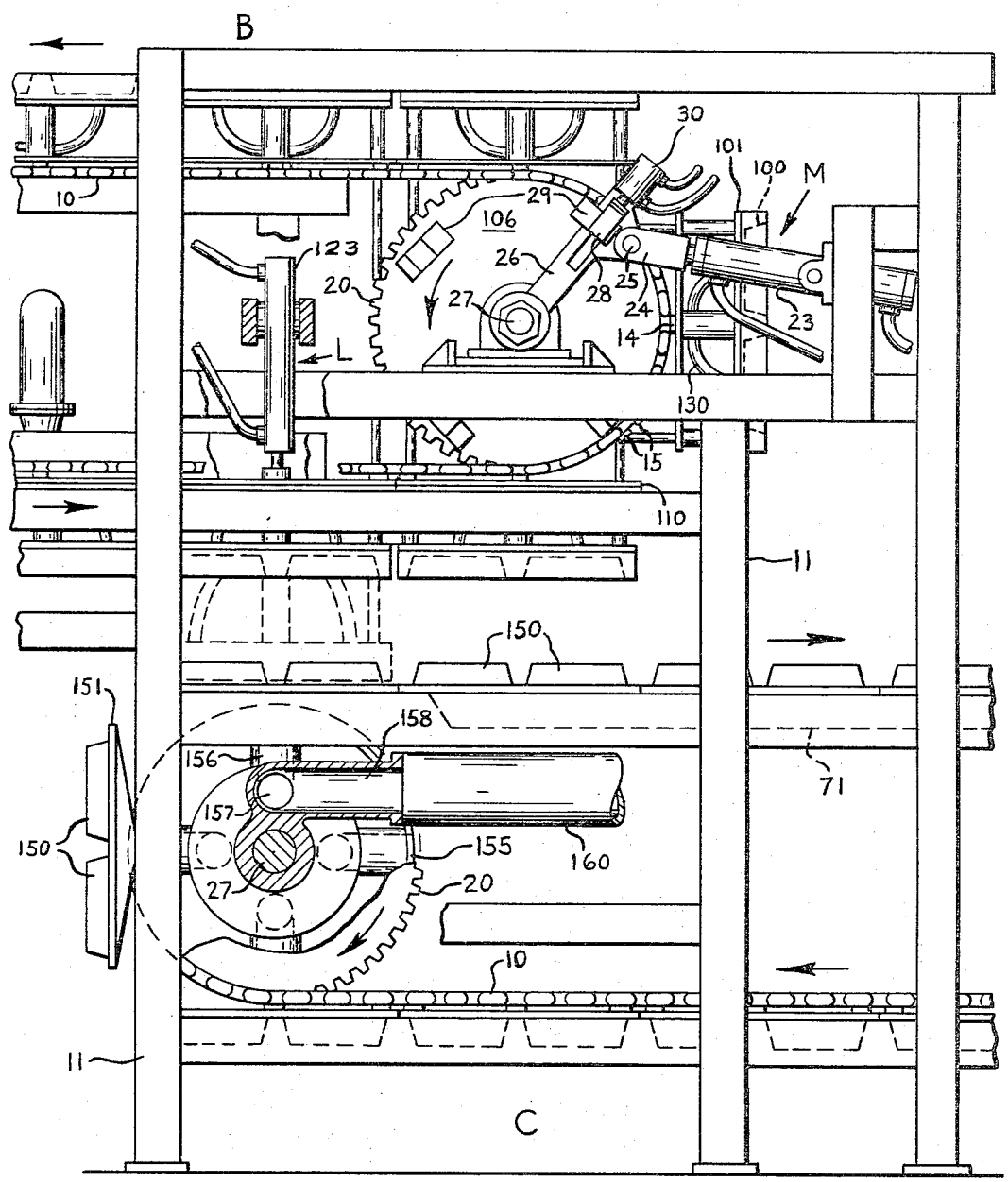
FIGURE 5 is a similar view showing transfer station $T_2$ in FIGURE 1.

Still referring to FIGURE 4, the conveyor in section A is driven in step-by-step movement by a pair of reciprocating drive motors M having double acting fluid pressure cylinders 23 which are operative on the two sprocket wheels 20 on opposite sides of the compressed air wheel 22. Only one motor M and sprocket wheel 20 appear in FIGURE 4. Each cylinder 23 has a piston rod 24 pivotally connected at 25 with an arm 26 pivotally mounted on the shaft 27 which supports the wheels 20 and 22. This arm is freely rotatable independently of the wheels and is equipped with a slidable lug 28 which may be engaged with one after another of four notched plates 29 on sprocket wheel 20. Lug 28 is connected to a piston rod in a double acting cylinder 30 whereby the lug may be shifted radially back and forth between retracted and engaged positions with respect to the notched plates 29 as best shown in FIGURES 5 and 6 involving different wheels.

FIGURE 4 shows the lug 28 engaged with one of the notched plates 29 in preparation for a conveyor movement, it being observed that the notched plates 29 are spaced 90° intervals around the sprocket wheel. The die holders 12 are also spaced at 90° intervals around the wheels 20 and 22. Each full stroke of piston rod 24 rotates the wheels 20 and 22 90° clockwise and then holds the conveyor indexed in such position. In each conveyor movement, each die holder moves to the previous position of the die holder ahead of it and in each rest position there is one die holder directly on top center of each of wheels 21 and 22, one die holder on bottom center and one die holder midway between these positions. After each conveyor movement, the conveyor pauses in such rest position and, when it is time for another conveyor movement, the lug 28 is retracted by cylinder 30 and the arm 26 returned to its FIGURE 4 position by cylinder 23. This brings the arm 26 into a position alongside the next notched plate 29 so that lug 28 can be engaged therewith and piston rod 24 extended to effect another 90° rotation of the wheels.

Referring to FIGURE 1, a pair of pulp or fiber slurry tanks 41 and 42 is located under the left end of the conveyor in section A. Tank 42 is directly under the wheel 21 and the tank 41 may be located either one or two die holders in advance of that position as may be convenient. Both tanks are mounted for vertical movement by cylinders 43 in order to immerse the porous pick-up dies 13 in pulp or fiber slurry. Die holders 12 are in communication with stationary suction box 45 as they reach tank 41.

The purpose of the second tank is to form a laminated product when desired. Where a high quality calendered surface is desired on one face of the product, a high quality pulp or fiber may be used in one of the tanks to form such a surface while a more inexpensive type of pulp or fiber may be used in the other tank to form the main body of the product. A third tank may be employed to the right of tank 41 if a high quality pulp or fiber is desired on both faces of the product with an inexpensive pulp or fiber in between. In this way the present process and apparatus allows as many laminations as may be desired by merely adding more tanks to the right of tank 41.

The tank 41 and any additional tanks to the right of this tank may be stationary if desired and need not be mounted for vertical movement. Means will presently be described for moving the dies down into a stationary tank so that the tank does not have to be raised up to the die. Depending upon the shape of the die, it is more convenient in some cases to move the die downward into a stationary tank of slurry during the suction forming step.

Suction wheel 21 has four hollow spokes which always stop in vertical and horizontal positions as shown in FIGURE 2 when the conveyor pauses between movements. These positions are determined by sprocket wheels 20 (not shown) as described on wheel 22, the wheel 21 being an idle wheel driven by chains 10 from wheel 22. In practice, the hollow spokes in wheel 21 are paired as in the different wheel shown in FIGURE 6 in order to obtain sufficient flow capacity in a large machine but, for the purpose of explaining the suction system, only the four spokes on one end of the wheel need be considered, as shown in FIGURE 2.

Thus, spoke 51 is a bottom spoke in communication with a die holder 12 on the conveyor, 52 is a horizontal spoke in communication with a different die holder 12, and 53 is a top spoke in communication with another die holder while 54 is another horizontal spoke which is not in communication with a die holder. These numerals designate spoke positions and not particular spokes in the wheel. The inner ends of the three spokes at 51, 52 and 53 communicate with a stationary suction chamber 55 connected with a suction pipe 56. The other horizontal spoke at position 54 is cut off from suction by a plate 57 during the half turn while this spoke is not in communication with a die holder. For this purpose, the plate has an edge 58 which cuts off suction to the top spoke as soon as this spoke turns clockwise away from top position and an edge 59 which admits suction to the bottom spoke as soon as it reaches bottom position. Thus, the suction chamber 55 and plate 57 form a valve to connect the die holders with suction as they pass around the wheel 21. The die holders 12 are of hollow construction forming suction chambers behind the porous pick-up dies 13.

Opposite the horizontal spoke position 52 is a compression and de-watering station W which may be used optionally to perform a useful function on certain products. At this station there is a die holder 60 having porous de-watering dies 61. After wet pulp or fiber pre-forms have been deposited on dies 13 from the slurry in the tanks 41 and 42, some water is immediately extracted from the pre-forms by suction through the hollow spoke as it moves from position 51 to position 52 and when the pre-forms are thick, it is desired to remove a large amount of water quickly at this point by pressing the dies 61 against the exposed surfaces of the pre-forms. This is done by a piston rod 62 in double acting cylinder 63 reciprocating the die holder 60 horizontally to the right on its guides 64. Express of water into spoke 52 and release of dies 61 from the pre-forms is facilitated by applying compressed air through conduits 65 and 66 to the hollow die holder behind the die screens 61. This allows the dies 61 to be withdrawn in time for the next conveyor movement.

As the de-watered pre-forms reach the top of the wheel at spoke position 53, they may be given a water soluble resin coating from resin spray head 70, if desired. At this time the pre-form is in its most porous condition, especially if it has not been greatly compressed by die 61, and, with suction on the top spoke 53, any resin thus applied is drawn well into the thickness of the pre-form to impregnate its interior.

Upon leaving the wheel 21, suction is resumed by means of a channel-shaped suction box 71 connected with a plurality of suction pipes 72. During the step-by-step movement of the die holders to the right along the upper reach of the conveyor in section A, the pre-form is dried from its upper surface to center by a series of vertically movable drying dies indicated generally at 75 in FIGURE 1. Each time the conveyor stops, these dies are moved down against the die holders 76. The whole assembly is preferably enclosed by a vented hood 77 to confine the heat. Suction box 71 has a hole in its top which is in communication with a die holder 12 at each station under a drying die 75.

FIGURE 11 illustrates the structure of the drying dies 75. The casing of die 75 forms a steam chamber to which steam is admitted through a hose 80. Dry super-heated steam is projected onto the pre-form through openings in a perforated die plate 81 which conforms to the shape of the pre-form P. Hot air may be used but steam is preferred. Baffle 82 distributes the incoming steam to all parts of the steam chamber 83 so that the steam will act uniformly on all parts of the pre-form P. The lower edge of the casing of die 75 seats on a seal ring 84 surrounding the pick-up die 13 causing the steam to pass through the pre-form to suction box 71 which is in communication with the suction chamber 85 through opening 86 in each die holder 12 and an opening 87 in the suction box at each drying station. The die holders 12 and 75 are equipped with interfitting holes and locating pins (not shown) to insure proper registration when they come together.

The sliding seal joint between the die holder and suction box have been omitted from FIGURE 11 and are shown separately in FIGURE 14. An annular seal ring 90 in the bottom of die holder 12 is pressed against the flat top of the suction box by springs 88 for sliding engagement and the opening in this seal ring is connected with opening 86 by a flexible rubber tube 89 which limits the extension of the springs. The openings 86 in FIGURES 11 and 14 may be the same opening or they may be communicating openings in adjacent parts of the die holder 12. Suction is shut off from suction box 71 while the die holders 12 are moving, to reduce sliding friction, and is turned on during each dwell interval. Seal ring 90 also cooperates with the hollow spokes of the conveyor wheels as will be presently described.

For some products the porous plate 81 is made as a true die plate to engage and apply light compression and/or calendering to the pre-form P. In some cases these drying dies may be shaped and dimensioned to progressively increase the compression on the whole pre-form or on certain areas of the pre-form toward the end of conveyor section A. When no compression or calendering is desired in conveyor section A, the plates 81 may remain in spaced relation to the pre-forms P when the drying dies seat on seal ring 84.

The main function of this first drying stage in section A is to dry the pre-form from its outer surface to its center, leaving the opposite surface relatively moist and capable of easy release from the pick-up die 13. Previous attempts to dry a thick pre-form all the way through from one surface have been unsuccessful because of the excessive amount of heat required, causing the exposed surface to harden and deteriorate and causing the under surface to bake onto the pick-up die so that the pre-form would not release. In the present process and apparatus these difficulties are obviated and much thicker pre-forms can be dried easily by drying from opposite sides of the pre-form in two separate stages. The second drying stage is accomplished in the second section B and so provision is made for transferring the pre-forms from conveyor section A to conveyor section B.

Referring back to FIGURE 4, the compressed air wheel 22 has four pairs of hollow spokes which turn in each conveyor movement to the four different rest positions 91, 92, 93 and 94. In this case no suction is applied but compressed air from a supply pipe 95 flows through each spoke as it turns to top position 91. This applies pressure to the chamber 85 under the pick-up die 13 to release the pre-form P and assist in transferring it to a die 100 in a die holder 101 on the conveyor of section B. For this purpose the left end of the conveyor in section B overlaps the right end of the conveyor in section A and the conveyor in section B is driven in step-by-step movement so that its die holders 101 will pause one after another immediately above the die holders 12 of conveyor section A when die holders 12 reach the wheel 22. Suction box 71 terminates to the left of wheel 22.

After leaving wheel 22, the pick-up dies 13 are washed at spray station 96 in FIGURE 1 before returning to the slurry tanks 41 and 42.

Similar to the first conveyor, the second stage conveyor in section B has chains 10 carrying the die holders 101 and trained around sprocket wheels 20 on a left suction wheel 105 and a right wheel 106 which contains merely a pair of the sprocket wheels 20 without either suction or compressed air. FIGURE 5 shows the driving arrangement which is the same as that described in FIGURE 4 except that the two drive motors M are reversed to move the wheels and conveyor in the opposite direction. Suction wheel 105 has pairs of hollow spokes (not shown) connected at their inner ends with a source of suction through a half revolution the same as suction wheel 21 in FIGURE 2 except that wheel 105 rotates counterclockwise.

Dies 100 are perforated plates which are contoured to fit and receive the top surface of the pre-form P as shown in FIGURE 12. In order to transfer the pre-forms from the pick-up dies 13 to the dies 100, the latter, which may be referred to as transfer dies, are arranged to be lowered into contact with the pre-forms when they reach their last station on conveyor section A which is on the top side of pressure wheel 22. Compressed air is not supplied to pipe 95 until the transfer dies 100 have been lowered at this station, as shown in broken lines in FIGURE 4. The transfer die holders 101 contain suction chambers and are in communication with a source of suction. Compressed air through spoke 91 of wheel 22 blows the pre-form off pick-up die 13 and suction in die holder 101 holds the pre-form on die 100. Then die holder 101 is raised to its normal solid line position in FIGURE 4 and conveyor section B advances the pre-form to the right in step-by-step movement through a plurality of drying and light or medium compression stations along the lower side of this conveyor section.

The above-described transfer operation is reversed in transferring the pre-form from conveyor section B to conveyor section C as shown in broken lines in FIGURE 5 where the die holder 101 is again projected downward as in FIGURE 4. These two transfer stations are designated at $T_1$ and $T_2$ in FIGURES 1, 4 and 5.

The lowering mechanism L for effecting vertical reciprocation of die holder 101 at the two transfer stations is shown in FIGURES 4, 5, 8, 9 and 10. Each transfer die holder 101 is suspended from a supporting plate 110 which is connected at its mid-length on each side with one of the chains 10 as shown in FIGURE 8. The under side of plate 110 has tubular guides 111 for vertical guide rods 109 on die holder 101. Each die holder 101 also has a pair of upward extensions 112 with T-slots 113 in their upper ends extending in the direction of the conveyor. The die holders are normally held in raised position by latches 115 engaged in recesses 116 in the extensions 112. Each latch is pivotally mounted at 117 on plate 110 and held in latched position by spring 118 as shown in FIGURE 9.

As the die holders and supporting plates 110 approach a transfer station, the slots 113 receive heads 121 on piston rods 122 in double acting fluid pressure cylinders 123. After heads 121 have entered the slots 113, cam followers 124 on the latches 115 engage stationary cams 125 on the machine frame 11 to withdraw the latches from the recesses 116. FIGURE 9 shows the positions of these parts as the support plate 110 comes to rest at a transfer station. Support of die holder 101 is thereby transferred from latch 115 to piston rod head 121 as shown in FIGURE 10. The piston rod is then actuated downward to lower the die holder 101 to transfer position as shown in broken lines in FIGURES 4 and 5.

After the pre-form has been transferred to or from the transfer die 100, the cylinders 123 are actuated to raise the die holder and then the next conveyor movement of conveyor section B is initiated. Before piston rod head 121 leaves the slot 113, cam follower 124 drops over the right end of cam 125, allowing latch 115 to re-engage the recess 116 to support the die holder in raised position. As the conveyor continues to move, die extension 112 leaves the piston rod head 121 as indicated by the relative position of the latter in broken lines in FIGURE 9. The lowering mechanism and cam 125 shown in FIGURES 9 and 10 are present at both transfer stations $T_1$ and $T_2$ shown in FIGURES 4 and 5. The operation of this mechanism is the same regardless of whether the pre-form is being transferred to conveyor section B or away from conveyor section B.

The transfer mechanism shown in FIGURES 9 and 10 may also be employed in the first conveyor section A to depress the pick-up dies 13 into one or more stationary slurry tanks in lieu of using the raising and lowering tanks 41 and 42. Depending upon the shape of the product, it is sometimes advantageous to lower the pick-up die into the slurry instead of raising the tank up to the die as shown in FIGURE 1. In making a laminated product there would, of course, be one tank for each lamination desired and a die lowering station L as shown in FIGURES 9 and 10 at each tank. This would require the die holders 12 to be mounted for vertical movement on die supporting plates connected with the chains 10 similar to the arrangement of die supporting plates 110 in FIGURE 8. In such an arrangement, a raising and lowering tank 42 may still be used under suction wheel 21 to form the last lamination, if desired.

Referring again to conveyor section B, as the dies 100 progress along the under side of this conveyor section from left to right in FIGURE 1, continuous suction is maintained in the die holders 101. For this purpose, flexible suction hoses 130 connect the die holders with a suction connection 131 on plate 110 as shown in FIGURE 8. This suction connection has an opening in continuous communication with a slot in the under side of suction box 133 mounted on the machine frame 11 as shown in FIGURE 4. Suction is maintained by connection at intervals with a suction pipe 134.

In order to reduce friction the suction is reduced to a low value just sufficient to hold the pre-forms to the under sides of dies 100 during conveyor movements. Each time the conveyor stops, the suction is increased to a relatively high value. By this arrangement, the pre-forms are subjected to a relatively high vacuum at the drying stations in both conveyor sections A and B to remove water rapidly and pull the drying steam through the pre-forms rapidly.

At a plurality of stations along the underside of conveyor section B there are drying dies 140 mounted on die holders 141 which may be raised and lowered by double acting stationary fluid pressure cylinders 142 as shown in FIGURE 8. Steam is supplied through flexible conduits 143 from a supply pipe 144. Stationary guides 145 receive guide rods 146 on the die holders 141. Hot air may be used but steam is preferred as in the first drying stage.

The construction of drying dies 140 is shown in FIGURE 12. These drying dies and die holders are similar to the drying dies and die holders shown in FIGURE 11 except that the dies 140 are shaped to correspond to the opposite side of the pre-form P. The second conveyor section B constitutes a second drying stage for drying the still wet under side of the pre-form P after the upper side has previously been dried in the first drying stage in conveyor section A. Thus, the pre-form can be completely dried from both sides to center by the time it reaches the transfer station $T_2$ shown in FIGURE 5. When compression and/or calendering is desired, the dies 140 are shaped to engage the pre-form and apply the desired amount of pressure. For products which must undergo considerable compression, the compression increases from station to station and, when desired, the dies 140 may be shaped to apply more pressure to certain areas of the pre-form than other areas. When no compression or calendering is desired, the dies 140 are arranged to remain in spaced relation to the pre-forms when the dies 110 and 140 close together, the dies 140 then functioning merely as drying stages.

The pre-forms for certain high density products may contain a clay or other filler reducing the porosity. In such cases where the drying steam is not drawn freely through the pre-forms, the drying dies 75 and 140 may be vented to atmosphere to relieve the steam.

As will be present described, the formation of certain products begins in conveyor section B and conveyor section A is not used. For this purpose a resin and fiber spraying device 146 is mounted above the upper reach of the conveyor section B in FIGURE 1. This spraying device has spray heads 147 supplied by pipes 148 as shown in FIGURE 3 for spraying resin and fiber, or resin coated fibers, on the dies 100. The die holders are maintained under suction at the spraying stations by suction box 133a in FIGURE 4. The sprayed dies then pass around suction wheel 105 and the pre-forms are partially cured by drying dies 140 on the lower reach of conveyor section B.

A cleaning spray or vacuum brush 149 in FIGURE 1 is located ahead of the resin spray device 146 to clean the dies on their way to the spraying stations.

At the transfer station $T_2$ in FIGURE 5, the pre-forms are transferred to hard, porous compression dies 150 in conveyor section C. These dies are carried by die holders 151 of very heavy and rugged construction to withstand high pressing stresses. Otherwise, the die holders 151 are similar to the die holders 12 and are similarly connected to links of the conveyor chain 10 in conveyor section C. If the pre-forms have been subjected to compression in section B then the dies 150 must be dimensioned to compensate for the change in size.

At the transfer station $T_2$, die holders 151 pass around a suction wheel 155 which applies suction to each die holder only when it is on the top side of the wheel. For this purpose the pairs of hollow spokes of the suction wheel reach a top position 156 one pair after another, bringing the inner ends of the spokes into register with a port 157 in a suction chamber 158 connected with a suction pipe 160.

In order to transfer the pre-forms from dies 100 to dies 150, the end of suction box 133 over wheel 155 is partitioned off and connected with a compressed air supply. After dies 100 have been lowered, the compressed air is turned on momentarily to flow through a hole 132 and hoses 130 to die holder 101 in FIGURE 8. To the left of transfer station $T_2$ in FIGURES 1 and 5 the suction box 133 appears the same as shown in FIGURE 8 but has a continuous longitudinal suction slot at 132. Suction connection 131 has a top hole opening into this slot and plate 110 is equipped with a sealing strip which closes the slot on opposite sides of 131. These sealing strips on adjacent plates 110 are disposed in end abutting relation to close the entire length of the slot except at the openings in connections 131.

After leaving transfer station $T_2$, the pre-forms on dies 150 pass under resin sprays 169 in FIGURE 1 to receive a light surface coating of resin when desired. Then the pre-forms pass into a heavy duty press 170 having a vertically movable platen with a porous, perforated metal, press die 171 capable of exerting a pressure of four hundred pounds per square inch or higher on the pre-form. The dies 150 are adapted to withstand such pressure and are rigidly supported within the press. Both dies 150 and 171 are suitably heated in the press to cure the resin and both are porous and connected with suction to carry away steam generated in the curing process. Before the press die 171 backs off, compressed air is applied to the die momentarily to prevent the product from lifting off the conveyor die 150.

The pre-compression stages in conveyor sections A and B prepare the pre-form for high pressure consolidation in press 170, in the case of those products which are to be pressed in press 170. Without such pre-compression the pre-forms for high density products would be thick and rough and would roll and creep in the press with damage to the product. Gradual pre-compression in successive steps in section B eliminates this problem. The dies 150 and 170 can be dimensioned for the final density without damage to the product.

Adjacent to the press is a cleaning device 172 for the press die comprising a spray head or vacuum brush and catch basin movable into and out of the press. A cleaning station 173 cleans the dies 150 and a heating manifold 176 keeps them hot in the return flight of the conveyor. Heat manifold 177 provides a third stage drying, if necessary.

For certain products, it may be desired to apply the fibers directly to porous compression dies 150 on conveyor C ahead of press 170. For this purpose a suction box such as 71 in conveyor A may be used in this section also and heater 177 may be removed or shortened, or conveyor C may be lengthened, to provide room for lay-up.

Also, adjacent to the press is an available area 174 for miscellaneous operations such as, for example, a printing station for printing on the product, when desired, while it is still rigidly supported on dies 150. This area may also be utilized for means for inserting liners, parts, etc., into containers.

Near the press is a control panel 175 for controlling the various functions performed in the three conveyor sections A, B and C to make the different types of products to be described hereinafter.

After leaving the press 170, the dies 150 carrying the completed products pass around the compressed air and suction wheel 180 and are transferred to offbearing conveyor 181 which may pass through a resin spray or dip station, if desired. The construction of wheel 180 is shown in FIGURES 6 and 7. The wheel comprises four pairs of hollow spokes 185 which communicate at their outer ends with die holders 186. Each spoke has a resilient rubber seal ring 188 for establishing suction communication with openings 187 in the die holder parts 151 and 186. As shown in FIGURE 13, the die holders have resilient mating seal parts 88, 89, 90 as in the die holders 12 in FIGURE 14. The inner ends of the spokes have axial openings rotating in confronting relation to a pressure and suction manifold 190. Top, horizontal and bottom spoke positions are designated by the numerals 191, 192 and 193. As the spokes rotate downward step-by-step from top position, 90° in each increment of movement, they are in communication with a suction chamber 194 connected with a suction conduit 195.

The suction thus applied to the die holders 151 holds the products on the dies 150 as they are being inverted in passing around the wheel. When the spokes reach bottom position at 193, they communicate with a compressed air chamber 197 which operates to blow the product off dies 150 and onto the conveyor 181 where the articles designated at P in FIGURE 1 are now finished products. Compressed air chamber 197 is supplied by air pipe 196.

All the suction and compressed air wheels 21, 22, 105 and 155 are similar in general structure to the form of construction of wheel 180 shown in FIGURE 6 but only the wheels 22, 106 and 180 are equipped with the reciprocating drive motors M.

The whole apparatus is operated by pneumatic and hydraulic systems for the various fluid pressure cylinders. These systems are controlled by valves and switches connected to program the machine operations according to the particular process to be carried out. Control panel 175 provides manual selection of the appropriate sequence of operations for each process described.

*Expendable wood-like products*

Typical examples of expendable wood-like products are produce shipping containers and pallets. Waste or low-grade pulp consisting of pulp screenings, paper converter clippings, etc., are generally utilized for these products. Such materials must be pulped whereby the process for making these products starts at the wet end section of the machine on conveyor section A. Other natural fibers and man-made fibers of various materials may also be used such as glass, acetate, rayon, polyester, etc., and molding minerals such as asbestos and mica may be used. Fine glass beads may also be used. All such materials will be designated as fibers.

Further to reduce the product cost, low-grade resins may be employed and the pre-forms or products may be surface coated only. In order to compensate for a minimum resin impregnation, the pre-forms when of pulp are molded from a very dense, low freeness pulp. When desired, however, resin, or a blend of resins, may also be used in the slurry tanks. These resins are generally of the thermosetting type but thermoplastic resins may be used for some products.

In conventional processes it has heretofore been impossible to dry thick dense pre-forms at high volume productive speeds. When thick, dense pre-forms are dried according to conventional practice from one surface throughout, the exposed surface becomes case-hardened, further increasing drying time. If the drying time is prolonged to accomplish complete drying from one surface, the pre-form then dries onto and sticks to the screens of the pickup dies making release or transfer difficult. The present processes and apparatus solve this problem by eliminating the conventional long drying tunnel to dry in two stages, first one surface to center then opposite surface to center.

This process starts at the slurry tanks 41 and 42 in FIGURE 1. As previously described, the purpose of having two or more tanks is to form a laminated product from two or more different grades of pulp or fibers. When a laminated product is not desired, only one of the tanks would be used. In the case of shipping containers, for example, the first tank would contain a low-grade material for forming the outside portion and main body thickness of the container and the second tank would furnish a better grade or different kind of material to form the inside surface of the container. This permits the use of cheaper material on the outside which is not approved for produce and an approved grade or type of material on the inside of the container. In the case of such containers, the pre-forms may be molded to an original thickness in the order of .2 inch and subsequently consolidated to a product thickness of .1 inch. All such dimensions are given by way of example and not for the purpose of limitation.

The present apparatus allows the option of using suction only to remove water from the fiber, using the compression and de-watering die 61 in FIGURE 2 only, or both combined. For such products as containers, the consolidating action of compression die 61 may not be desired because of its effect of reducing porosity and impeding drying. On the other hand, in molding large pallets and the like, a slower conveyor cycling time is used which allows more drying time to compensate for the reduced porosity and in such cases the de-watering die 61 may be used. In general, it may be said that this die is desirable for the lower production speed molding of large bulky articles which are relatively expensive but it is not desired for the molding of smaller, less expensive products at higher production speeds.

As the pre-forms leave the wheel 21, the porous pickup dies 13 are in communication with suction box 71 at each rest station to withdraw moisture from the pre-forms. At the same time, the steam heated drying dies 75 dry the pre-form from its upper surface to center. A moderate degree of compression may be applied by appropriately shaping the dies and by regulating the fluid pressure applied to cylinders 76. The under surface of the drying dies may be polished to steam calender the pre-forms, if desired.

The partially dried pre-forms are then transferred at transfer station $T_1$ to the dies 100 in conveyor section B. Transfer is effected by applying air pressure to the top spokes of wheel 22 and simultaneously applying suction to the dies 100. The blow-off from dies 13 is readily effected since the under surface of the pre-form remains moist and the pre-form is not caused to bake onto the die screens. The steam applied by drying dies 75 is regulated to leave just enough moisture in the pre-forms to facilitate the transfer.

The dies 100 are in constant communication with suction through suction box 133. In section B the drying dies 140 dry the under sides of the pre-forms from surface to center. These dies may be shaped to the product and polished for pre-compression and steam calendering, if desired. Under such pre-compression, the pre-form is partially consolidated to provide smoother surfaces and preclude rolling pulp in the subsequent high pressure stage. Again, the heating is regulated to prevent sticking and facilitate transfer to the high compression dies 150 at transfer station $T_2$. Here the pre-forms are transferred by air pressure applied to the dies 100 and suction applied to the dies 150. Sticking tendency is avoided at this transfer also by reason of the fact that the sides of the pre-forms presented to dies 100 had already been dried in section A. If pre-compression has been applied by the dies 140, then the dies 150 must be appropriately sized to fit the new dimensions of the pre-form.

At the press station 170, up to four hundred pounds per square inch, more or less, may be applied to consolidate the pre-forms to final desired density and heat is applied to cure the resin. As previously noted, the compression dies 150 and 171 are porous and connected with suction means to remove steam from the pre-forms.

In molding expendable wood-like products, resins may be applied only at 70 in the wet end section with suction pulling the resin through the pre-form or the pre-form may be surface sprayed at 169 with a wax emulsion or resin after partial consolidation. Also, for an expendable type of product, it may be desirable to limit the resin application to surface spraying or dipping after press consolidation. The apparatus allows for variations in the process.

With relatively thick initial pre-forms consolidated in the high pressure press 170, the product has good inherent strength combined with resilience to absorb impact and distribute stress. The desired strength is imparted by including long as well as short fibers and fillers in the slurry tanks 41 and 42 and by including suitable internal sizing material or water soluble resins. A surface resin coating seals the surface and adds to the strength, waterproof and durability qualities. Resin saturation by application of certain resins at the resin sprays 70 improves the strength but increases the brittleness and reduces impact resistance. Thus, it is possible to obtain different qualities for different kinds of products in the expendable wood-like products category. If the product is very thick, as for example .25 inch, brittleness does not present a problem and it is not necessary to depend upon flexibility and resilience to absorb and distribute impact stresses.

When resin is employed in the slurry or applied at 70, prior to the drying stages, the pre-form temperature must be kept below the curing temperature in drying stages A and B. Then curing temperature is applied in final consolidation in press 170. Because the press dies 150 and 171 are porous suction dies, the press will tolerate up to 25% moisture to facilitate compression. This allows the pre-forms to leave drying stages A and B less than bone dry at the surfaces in contact with the dies 13 and 100, which also tends to reduce sticking. In this process, press 170 accomplishes final drying as well as final compression.

Durable wood-like products

Durable wood-like products have heretofore been made by charging non-porous dies or forms with a mixture of wood flour, such as sandings from plywood mills, and various resins. Press compression has been relied upon to distribute the charge between dies. This method of manufacture has limited such products to substantially flat shapes which depend on the heated press dies to heat the charge from room temperature and cure the resin. Owing to the poor heat conductivity of dry loose material, considerable press time is required.

Durable wood-like products made by the hardboard industry are similary limited and the same is true of particle board products. All these products are limited to substantially flat shapes and production speeds are limited.

In the present apparatus, more complex shapes can be produced economically with high tapered walls, contours, ribbing elevations, etc., such as heavy duty pallets, window frames, furniture sections and the like. For this process the wet end section A is shut down and the process starts by blowing, shaking or pouring the resin coated dry materials onto the porous dies 100. In the machine illustrated, this function is accomplished by the spraying station 146 in FIGURE 1 where the materials are sprayed onto porous dies 100 in one or more coatings which are connected with suction to hold the material on the dies. In practice, the spraying station 146 usually includes a number of die stations with different nozzle arrangements as may be required to coat all surfaces of dies having simple or complex shapes.

Although the sprayed material may include moisture, this is referred to as a dry process in view of the fact that it does not involve the wet end section A and the slurry tanks 41 and 42. Moisture is desirably included with certain resins to increase plasticity and such moisture may be tolerated in the present process. With moisture, the material is distributed in a somewhat sticky consistency over the porous dies with suction holding the material onto the dies.

The various fibers and other materials previously mentioned can be used in this process. Products heretofore vacuum formed from sheet plastics can be made faster and more economically by the present process using the raw fibers. The materials are cheaper and trim waste is eliminated.

Suction wheel 105 holds the material on the dies as they rotate to the under side of conveyor section B for drying and pre-compression by dies 140, these dies being kept below the resin curing temperature. The heat in dies 140 plus the suction applied to dies 100 removes moisture added for plasticity and the heat warms the pre-form throughout to make it soft and pliable. This facilitates the rapid molding of complex shapes and the preliminary compression effected by dies 140 further facilitates and expedites complex molding by imparting shape to the pre-forms in preparation for final consolidation. The process, of course, is not limited to complex shapes; relatively flat and board-like products can be made, similar to conventional products.

At transfer station $T_2$, the pre-heated and pre-compressed pre-forms are transferred to porous high compression dies 150 by applying suction to the latter and air pressure to the dies 100. Transfer is accomplished easily in the warmed condition of the resin. Accordingly, the press 170 is required to effect final consolidation and finish curing only. Curing temperature is provided here and curing occurs rapidly as the pre-forms are already hot and just below curing temperature throughout.

As a variation of this process the fibers or other molding materials, pre-coated with resin, may be applied directly to the porous compression dies 150 in space provided ahead of heater 177. The application may be by spray or by hand. Any moisture added for plasticity may be removed by open heater 177 and suction from a suction box under the die holders as previously mentioned. Such pre-forms would then go directly into press 170.

Molded pulp products

In this process the press consolidation section C is shut down and the two conveyor sections A and B are used. Varying grades of pulp can be laminated as in the case of expendable wood-like products. Multiple pulp tanks can be employed to advantage for producing any desired number of laminations. In addition to laminating varying grades of pulp, different products can be molded at the same time requiring different pulps or different colored pulps. This is easily accomplished by merely controlling the lifting cylinders 43 in FIGURE 1 to rise under selected dies instead of rising under each and every die as it comes along. Also, with immersion pick-up, very deep products can be molded. Most conventional pulp molding machines are limited to a two to four inch draw.

Excess water may be removed by compression die 61 in FIGURE 2, if desired, as previously described. After leaving wheel 21, water is substantially continuously removed by suction on the dies 13. If wet strength resins or waxes are desired, the latter are added by sprays 70. The drying dies 75 dry from top surface to center and this surface may be calendered, if desired.

In section B the pre-forms are dried from bottom surface to center and that surface likewise may be calendered by the drying dies, if desired. The chief difference between this process for molded pulp products and the process described for expendable wood-like products is in the types of resins or waxes used and the thickness of the pre-forms and thickness of the final products. Generally speaking, molded pulp products are about .055 inch thick and require but little strength.

Since press consolidation section C is not used for molded pulp products, shaped drying dies in section B are relied upon to produce the desired final compression. This compression may increase from station to station along the under side of conveyor section B. For example, the last two drying dies 140 may apply a pressure in the range between twenty-five to seventy-five pounds per square inch on the pre-form with the preceding dies 140 operating at a lower pressure. The pressure applied by first stage drying dies 75 would be adjusted appropriately in relation to this final value.

Further, the drying dies 140, or at least the last two of them, may be shaped to apply selective compression to the pre-forms. In selective compression, one area of the pre-form may be compressed very lightly and other areas to a greater density and less thickness. It may be desirable to have a part of the product more resilient and with greater surface smoothness and another part of firm board-like strength. As an example of such product, it is desired in apple trays to have firm and tough outer edges to facilitate automatic packaging and soft resilient apple cushions to protect the fruit. This can readily be accomplished by shaping the dies 140 to apply relatively high pressure in the desired hard areas and relatively low pressure in the desired soft areas.

For relatively simple and shallow molded pulp products, a plain belt conveyor such as 181 may be substituted for the chains carrying dies 150 in section C. Such conveyor may be allowed to run freely through the inactive press 170 whereby there is no necessity for moving the press. Such products are readily released from the dies 100 by air pressure at transfer station $T_2$ without requiring suction in the lower conveyor. Also, the die lowering mechanism L need not be operated. The products may be printed in two colors in printing station 174 since this station extends over two adjacent conveyor stations. For more complex or deep products, the conveyor C with porous suction dies may be used with transfer station $T_2$ in normal operation to insure release of the products from dies 100. Press 170, however, would remain open and out of operation.

In the appended claims the term fiber includes pulp and also any non-fibrous materials suitable for the purposes described such as the materials mentioned hereinabove.

Having now described our invention and in what manner the same may be used, what we claim as new and desire to protect by Letters Patent is:

1. A pulp molding machine comprising first and second drying stages, said first drying stage comprising a first chain conveyor section and said second drying stage comprising a second chain conveyor section, an endless chain of die holders in said first conveyor section carrying porous suction pick-up dies, means driving said first conveyor and its die holders in step-by-step movement, an aqueous slurry pick-up station in the run of said first conveyor, drying stations in the run of said first conveyor, drying dies in said drying stations arranged to cooperate with said pick-up dies, an endless chain of die holders in said second conveyor section carrying porous transfer dies, means driving said second conveyor and its die holders in step-by-step movement, a transfer station for transferring partially dried pre-forms from said pick-up dies to said transfer dies, drying stations in the run of said second conveyor, drying dies in said last drying stations arranged to cooperate with said transfer dies, a third chain conveyor section having an endless chain of die holders carrying compression dies, means driving said third conveyor and its die holders in step-by-step movement, a transfer station for transferring the pre-forms from said transfer dies to said compression dies, and a high pressure hot press in said third conveyor section.

2. A machine as defined in claim 1, including a resin spray station in said third conveyor section ahead of said hot press.

3. A machine as defined in claim 1, said compression dies being porous and said hot press having a porous die.

4. A machine as defined in claim 3, said porous compression dies and said porous hot press die being suction dies for removing moisture from the pre-form.

5. A pulp molding machine comprising suction pick-up dies, means for forming pre-forms on said dies from an aqueous slurry, a first drying stage arranged to dry said pre-forms from one side to center, a second drying stage arranged to dry said pre-forms from opposite side to center, means to move said pre-forms from said forming means to said first drying stage and from said first drying stage to said second drying stage, a high compression stage, and means for moving said pre-forms from said second drying stage to said high compression stage.

6. A machine as defined in claim 5, including means for applying resin to the pre-forms prior to high compression.

7. A molding machine comprising three chain conveyor sections each having an endless chain of die holders and dies disposed in horizontal flights, the second section overlapping the ends of the first and third sections, a pick-up station having a slurry tank in said first section, a first drying stage with applied head in said first section, a second drying stage with applied heat in said second section, a high compression stage in said third section, and transfer stations for transferring pre-forms from the end of said first drying stage to the beginning of said second drying stage and for transferring the pre-forms from the end of said second drying stage to said high compression stage.

8. A machine as defined in claim 7, including separate reciprocating motor means for operating each conveyor in step-by-step movement.

9. A machine as defined in claim 7, including means for building up fiber and resin pre-forms on the dies of said second conveyor ahead of said second drying stage.

10. A machine as defined in claim 7, including low compression dies operable on the pre-forms in said first drying stage, and medium compression dies operable on the pre-forms in said second drying stage.

11. A machine as defined in claim 7, said pick-up station being in the lower flight of said first conveyor, said first drying stage being in the upper flight of said first conveyor, said second drying stage being in the lower flight of said second conveyor, and said high compression stage being in the upper flight of said third conveyor.

12. A molding machine comprising three chain conveyor sections each having horizontal flights of dies trained around sprocket wheels, the second section overlapping the ends of the first and third sections, a slurry tank pick-up station and a first drying stage in said first section, a second drying stage in said second section, a high compression press in said third section, a first transfer station having means to depress a second section die onto a pre-form on a first section die on the end sprocket wheel of said first section, and a second transfer station having means to depress a second section die with a pre-form onto a third section die on the beginning sprocket wheel of said third section.

13. A molding machine comprising a chain conveyor having an endless chain of die holders carrying porous suction dies, means above the upper flight of said conveyor for applying resin and fiber to said dies in a substantially dry state to form pre-forms on the dies, heated pressing dies arranged to compress said pre-forms on said suction dies in the lower flight of said conveyor, a hot press, another conveyor running through said hot press, and a transfer station for transferring the pre-forms from said first conveyor to said other conveyor.

14. A molding machine comprising a chain conveyor having an endless chain of porous suction dies, means for applying resin and fiber to said dies in a substantially dry state to form pre-forms on the dies, a series of heated pressing dies arranged to shape and compress said pre-forms on said dies in successive stages, means for maintaining suction on said dies during the application of fiber and in said compression stages, a hot press, another conveyor having dies running through said hot press, and a transfer station for transferring the pre-forms from said chain conveyor to said other conveyor.

15. A molding machine comprising a pre-form forming station, a compression station, and a hot press station, die holders having porous suction dies, conveyor means arranged to move pre-forms on said dies from station to station, means at said forming station for applying resin and fiber to dies in said forming station in a substantially dry state to form pre-forms on the dies, a series of heated pressing dies arranged to shape and compress said pre-forms in successive stages on said dies in said compression station, means to maintain suction on said dies in said forming and compression stations, and a hot press arranged to hot press said pre-forms in said hot press station.

16. A molding machine as defined in claim 15 including means for applying additional resin to surfaces of the pre-forms between said compression station and said hot press station.

17. A molding machine as defined in claim 15 including means to heat said pre-forms between said compression station and said hot press station.

References Cited

UNITED STATES PATENTS

| | | | |
|---|---|---|---|
| 1,984,019 | 12/1934 | Hawley | 162—226 X |
| 2,082,409 | 6/1937 | Manson | 162—379 |
| 2,321,756 | 6/1943 | Kyle | 162—377 X |
| 2,969,835 | 1/1961 | Young | 162—408 X |
| 3,205,128 | 9/1965 | Justus et al. | 162—408 X |
| 1,628,257 | 5/1927 | Mallory | 25—100 |
| 2,365,804 | 12/1944 | Clerke | 18—21 |
| 2,429,431 | 10/1947 | Sloan | 162—164 X |
| 3,033,737 | 5/1962 | Peters | 18—19 |
| 3,181,202 | 5/1965 | Martelli et al. | 18—19 |
| 3,317,371 | 5/1967 | Alsman | 162—395 X |

S. LEON BASHORE, *Primary Examiner.*

DONALL H. SYLVESTER, *Examiner.*

J. H. NEWSOME, *Assistant Examiner.*